(12) United States Patent
Li et al.

(10) Patent No.: US 12,307,130 B2
(45) Date of Patent: May 20, 2025

(54) DATA WRITING METHOD FOR AVOIDING REPEATED WRITING, MEMORY STORAGE DEVICE, AND MEMORY CONTROL CIRCUIT UNIT

(71) Applicant: PHISON ELECTRONICS CORP., Miaoli (TW)

(72) Inventors: Wei-Cheng Li, Miaoli County (TW); Yu-Chung Shen, Miaoli County (TW); Jia-Li Xu, New Taipei (TW); Ping-Cheng Chen, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 32 days.

(21) Appl. No.: 17/967,884

(22) Filed: Oct. 17, 2022

(65) Prior Publication Data
US 2024/0086109 A1    Mar. 14, 2024

(30) Foreign Application Priority Data
Sep. 8, 2022   (TW) .................................. 111134061

(51) Int. Cl.
*G06F 3/06* (2006.01)
(52) U.S. Cl.
CPC .......... *G06F 3/0659* (2013.01); *G06F 3/0604* (2013.01); *G06F 3/0652* (2013.01); *G06F 3/0679* (2013.01)
(58) Field of Classification Search
CPC .... G06F 3/0659; G06F 3/0604; G06F 3/0652; G06F 3/0679
See application file for complete search history.

(56) References Cited

U.S. PATENT DOCUMENTS

| | | | | |
|---|---|---|---|---|
| 10,403,379 B1 * | 9/2019 | Kuo | .................... | G11C 29/44 |
| 2016/0291872 A1 * | 10/2016 | Hashimoto | ............ | G06F 3/061 |
| 2019/0107961 A1 * | 4/2019 | Lee | ..................... | G06F 3/0653 |
| 2020/0005875 A1 * | 1/2020 | Yang | ..................... | G11C 29/82 |
| 2023/0268008 A1 * | 8/2023 | He | ........................ | G11C 16/16 |
| | | | | 365/185.29 |

FOREIGN PATENT DOCUMENTS

TW       I306255       2/2009

OTHER PUBLICATIONS

"Office Action of Taiwan Counterpart Application", issued on Jun. 12, 2023, p. 1-p. 5.

* cited by examiner

*Primary Examiner* — Edward J Dudek, Jr.
(74) *Attorney, Agent, or Firm* — JCIPRNET

(57) ABSTRACT

A data writing method, a memory storage device, and a memory control circuit unit are provided. The method includes: receiving a write command from a host system, and the write command including first data; checking a status of a first physical programming unit in a first physical erasing unit; in response to the status of the first physical programming unit being a first status, sending a first command sequence to a rewritable non-volatile memory module, and the first command sequence being configured to instruct the rewritable non-volatile memory module to store at least part of the first data to the first physical programming unit.

21 Claims, 12 Drawing Sheets

DATA WRITING METHOD FOR AVOIDING REPEATED WRITING, MEMORY STORAGE DEVICE, AND MEMORY CONTROL CIRCUIT UNIT

CROSS-REFERENCE TO RELATED APPLICATION

This application claims the priority benefit of Taiwan application serial no. 111134061, filed on Sep. 8, 2022. The entirety of the above-mentioned patent application is hereby incorporated by reference herein and made a part of this specification.

BACKGROUND

Technical Field

The disclosure relates to a memory management technology, and more particularly to a data writing method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into the various portable electronic devices exemplified above.

Traditionally, the write operation executed in the rewritable non-volatile memory module takes one or more physical pages as the basic unit to write data. However, in fact, when the rewritable non-volatile memory module writes data to a certain physical page (also referred to as a first physical page), the data may also be unexpectedly written to other physical pages (also referred to as a second physical page) due to "word line short". Afterwards, when the second physical page is actually used to store data, the second physical page is repeatedly written, thereby causing a decrease in the accuracy of the data subsequently stored to the second physical page.

SUMMARY

The disclosure provides a data writing method, a memory storage device, and a memory control circuit unit, which can improve the above issue.

An exemplary embodiment of the disclosure provides a data writing method for a rewritable non-volatile memory module. The rewritable non-volatile memory module includes multiple physical erasing units. The physical erasing units include a first physical erasing unit. The data writing method includes the following steps. A write command is received from a host system. The write command includes first data. Before storing the first data, a status of a first physical programming unit in the first physical erasing unit is checked. In response to the status of the first physical programming unit being a first status, a first command sequence is sent. The first command sequence is configured to instruct the rewritable non-volatile memory module to store at least part of the first data to the first physical programming unit.

An exemplary embodiment of the disclosure further provides a memory storage device, which includes a host interface unit, a rewritable non-volatile memory module, and a memory control circuit unit. The host interface unit is configured to couple to a host system. The rewritable non-volatile memory module includes multiple physical erasing units. The physical erasing units include a first physical erasing unit. The memory control circuit unit is coupled to the host interface unit and the rewritable non-volatile memory module. The memory control circuit unit is configured to execute the following. A write command is received from the host system. The write command includes first data. Before storing the first data, a status of a first physical programming unit in the first physical erasing unit is checked. In response to the status of the first physical programming unit being a first status, a first command sequence is sent. The first command sequence is configured to instruct the rewritable non-volatile memory module to store at least part of the first data to the first physical programming unit.

An exemplary embodiment of the disclosure further provides a memory control circuit unit, which is configured to control a rewritable non-volatile memory module. The rewritable non-volatile memory module includes multiple physical erasing units. The physical erasing units include a first physical erasing unit. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to execute the following. A write command is received from the host system. The write command includes first data. Before storing the first data, a status of a first physical programming unit in the first physical erasing unit is checked. In response to the status of the first physical programming unit being a first status, a first command sequence is sent. The first command sequence is configured to instruct the rewritable non-volatile memory module to store at least part of the first data to the first physical programming unit.

Based on the above, in the data writing method, the memory storage device, and the memory control circuit unit provided by the embodiments of the disclosure, the status of the first physical programming unit may be checked before writing data to the first physical programming unit. If the status of the first physical programming unit is as expected (that is, the status of the first physical programming unit is the first status), executing a first write operation on the first physical programming unit is allowed to store the first data to the first physical programming unit. In this way, repeated writing to a specific physical programming unit that reduces the accuracy of writing data can be effectively avoided.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
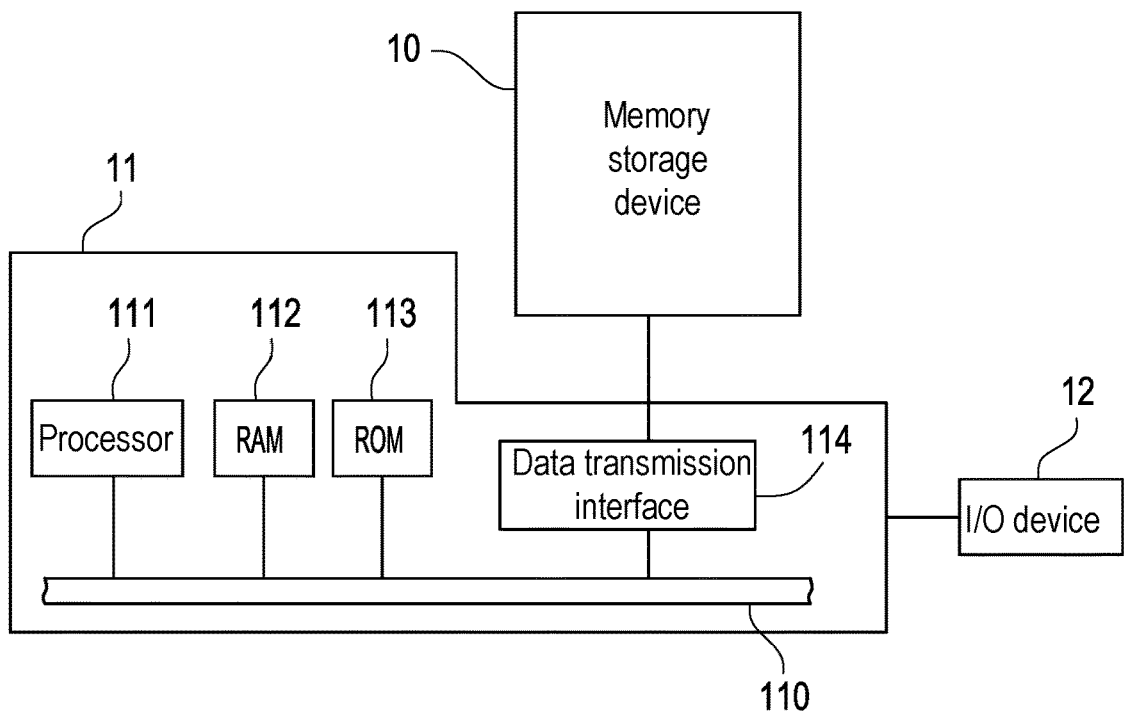
FIG. 1 is a schematic diagram of a host system, a memory storage device, and an input/output (I/O) device according to an exemplary embodiment of the disclosure.
Figure 2:
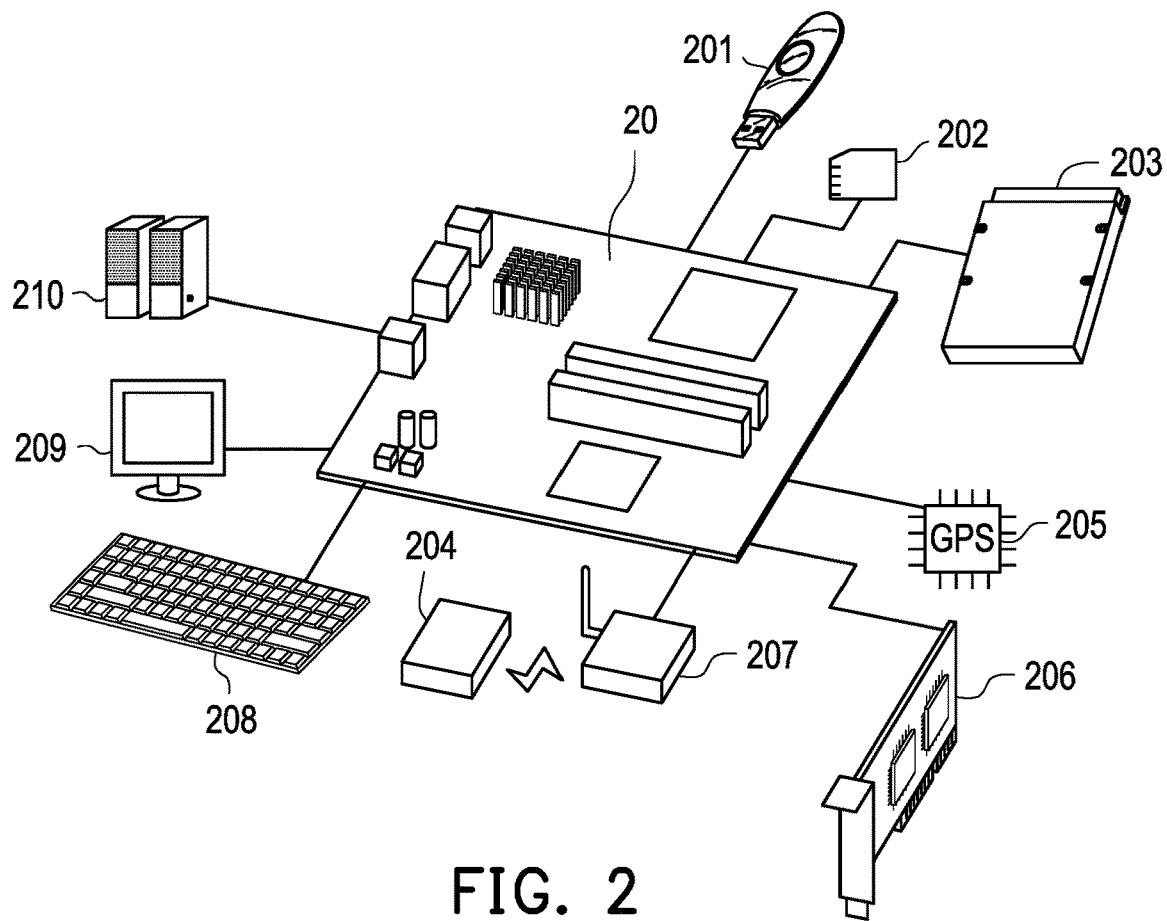
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data into the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard of the host system 11. The number of data transmission interfaces 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
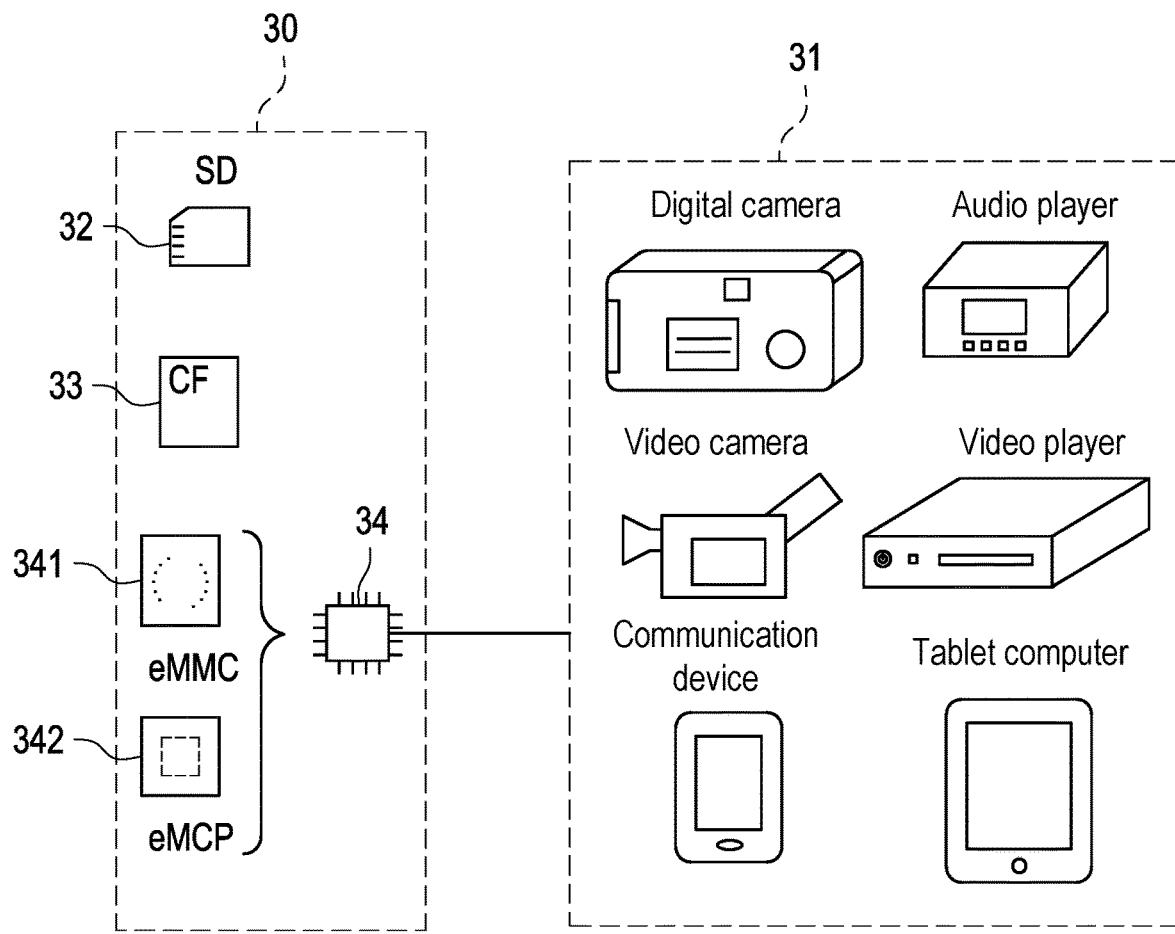
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
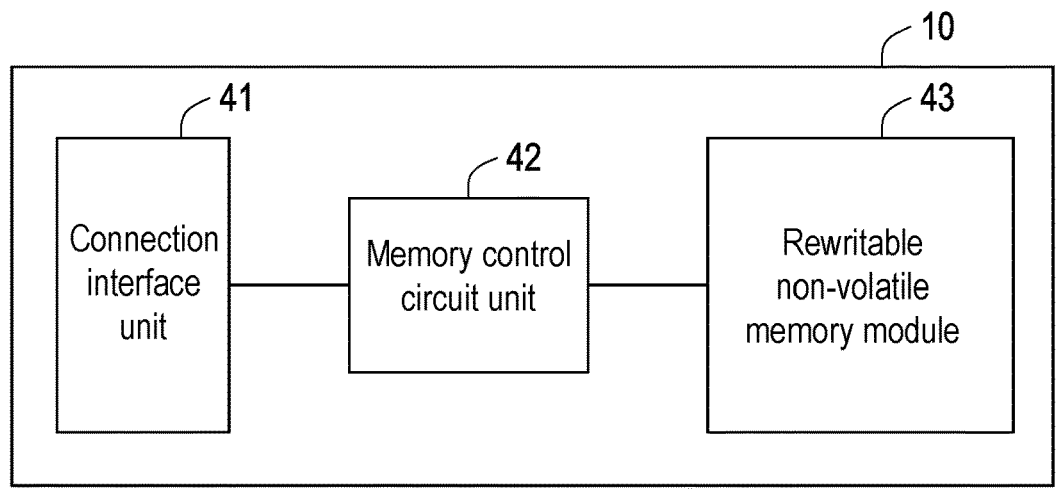
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is configured to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is configured to store system data (for example, management data such as an error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

Figure 5:
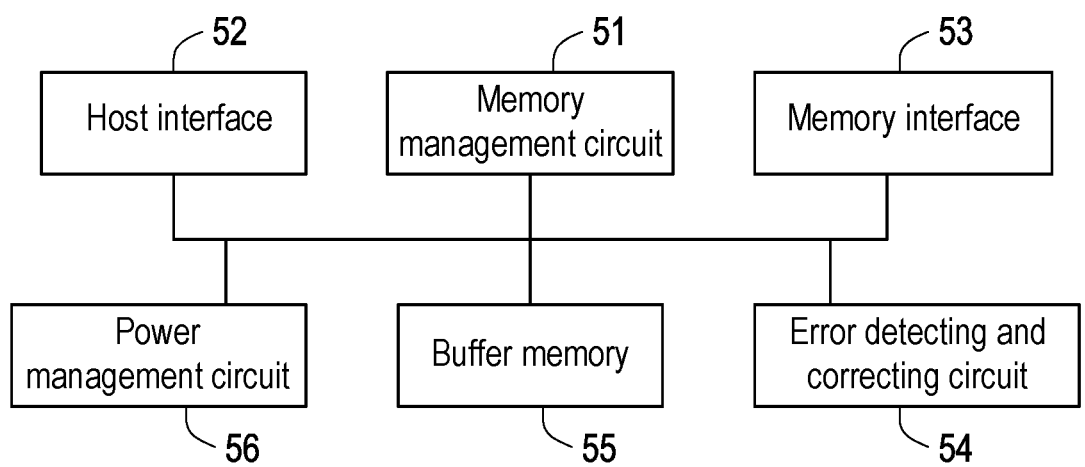
FIG. 5 is a schematic diagram of a memory control circuit unit according to an exemplary embodiment of the disclosure.

FIG. 5 is a schematic diagram of a memory control circuit unit according to an exemplary embodiment of the disclosure.

Please refer to FIG. 5. The memory control circuit unit 42 includes a memory management circuit 51, a host interface 52, and a memory interface 53. The memory management circuit 51 is configured to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored to a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 to the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage a memory cell or a memory cell group of the rewritable non-volatile memory module 43. The memory write circuit is configured to issue a write command sequence to the rewritable non-volatile memory module 43 to write data to the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written to the rewritable non-volatile memory module 43 and data read from the rewritable non-volatile memory module 43. The write command sequence, the read command sequence, and the erase command sequence may each include one or more program codes or command codes and are configured to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be configured to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage recycling operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is configured to execute error detecting and correcting operations to ensure the accuracy of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 will execute error detecting and correcting operations on the read data according to the error correcting code and/or the error detecting code.

The buffer memory 55 is coupled to the memory management circuit 51 and is configured to temporarily store data. The power management circuit 56 is coupled to the memory management circuit 51 and is configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
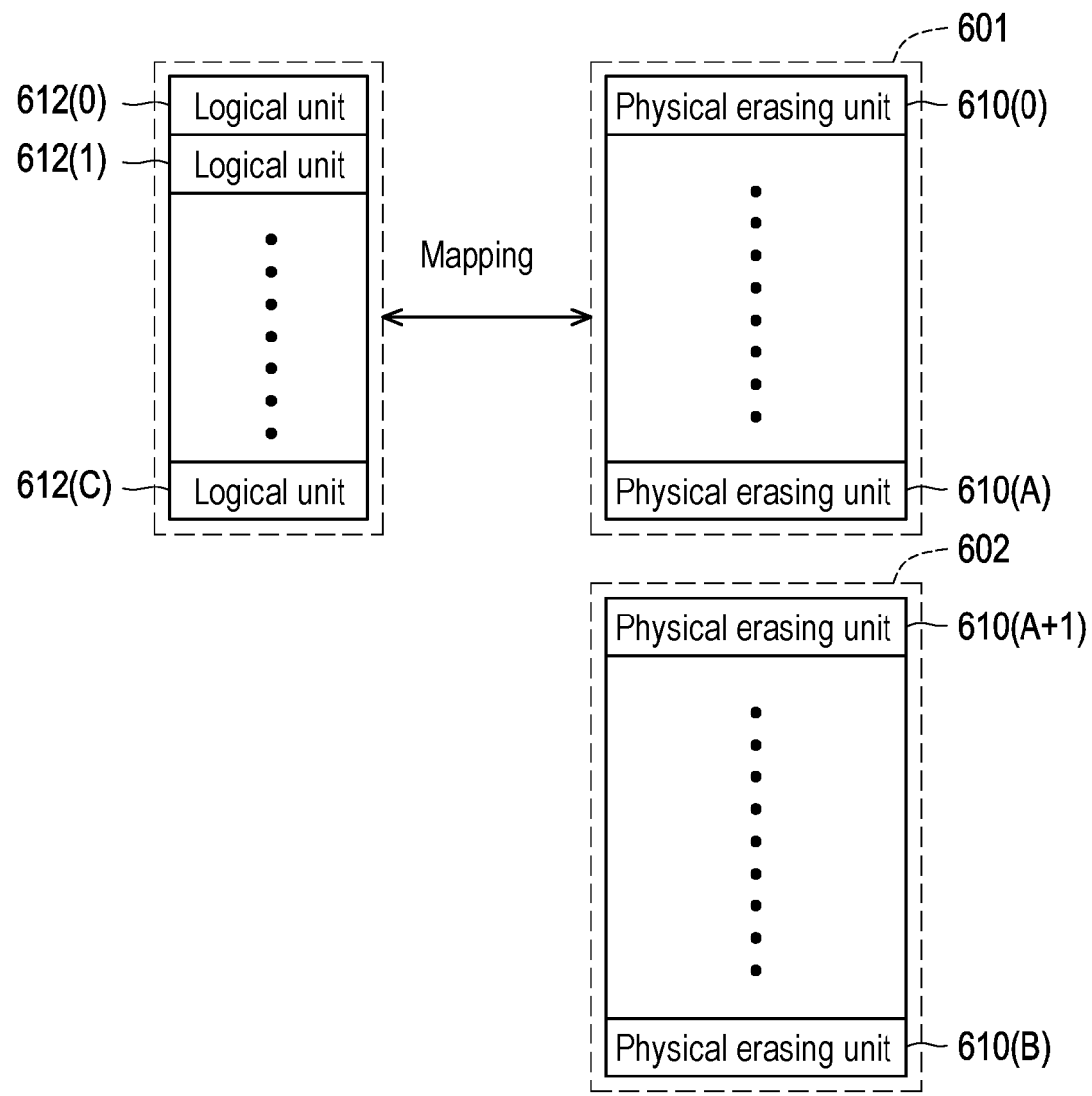
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. The memory management circuit 51 may logically group physical erasing units 610(0) to 610(B) in the rewritable non-volatile memory module 43 into a storage area 601 and a spare area 602. Each physical erasing unit may include multiple physical programming units.

The physical erasing units 610(0) to 610(A) in the storage area 601 are configured to store user data (for example, the user data from the host system 11 of FIG. 1). For example, the physical erasing units 610(0) to 610(A) in the storage area 601 may store valid data and/or invalid data. The physical erasing units 610(A+1) to 610(B) in the spare area 602 do not store data (for example, valid data). For example, if a certain physical erasing unit does not store valid data, the physical erasing unit may be associated (or added) to the spare area 602. In addition, the physical erasing units (or physical units that do not store valid data) in the spare area 602 may be erased. When writing new data, one or more physical erasing units may be extracted from the spare area 602 to store the new data. In an exemplary embodiment, the spare area 602 is also referred to as a free pool.

The memory management circuit 51 may be configured with logical units 612(0) to 612(C) to map the physical erasing units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses. It should be noted that one logical unit may be mapped to one or more physical erasing units. If a certain physical erasing unit is currently mapped by a certain logical unit, it means that data currently stored in the physical erasing unit includes valid data. Conversely, if a certain physical erasing unit is not currently mapped by any logical unit, it means that data currently stored in the physical erasing unit is invalid data.

The memory management circuit 51 may record management data (also referred to as logical-to-physical mapping information) describing a mapping relationship between the logical unit and the physical erasing unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

Figure 7:
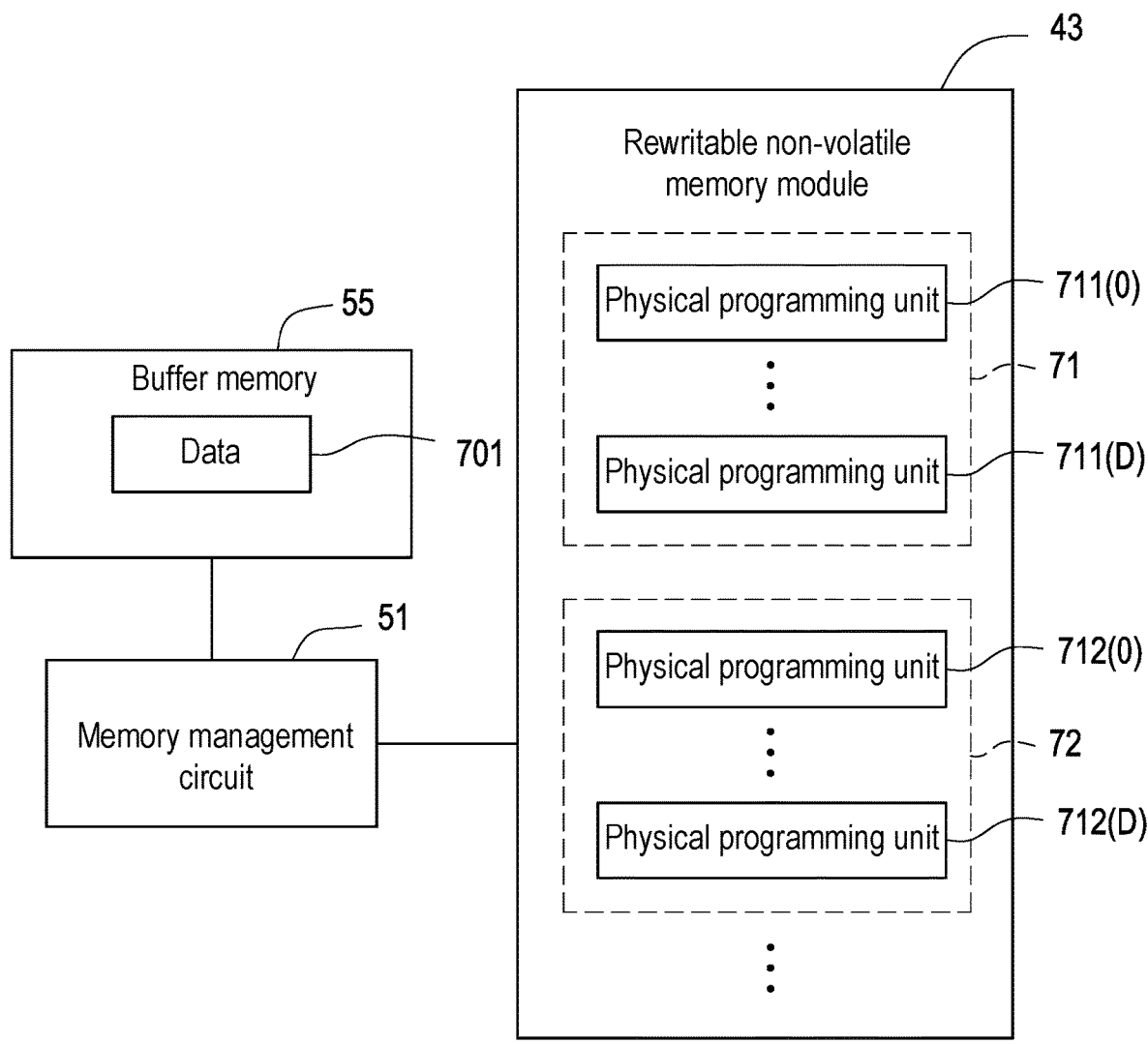
FIG. 7 is a schematic diagram of a usage scenario of a memory storage device according to an exemplary embodiment of the disclosure.

FIG. 7 is a schematic diagram of a usage scenario of a memory storage device according to an exemplary embodiment of the disclosure.

Please refer to FIG. 7. In an exemplary embodiment, the memory management circuit 51 may receive a write command from the host system 11 of FIG. 1. The write command may include data (also referred to as first data) 701. For example, the write command may instruct to store the data 701 to a particular logical unit. Then, the memory management circuit 51 may temporarily store the data 701 to the buffer memory 55.

In an exemplary embodiment, the rewritable non-volatile memory module 43 includes a physical erasing unit (also referred to as a first physical erasing unit) 71. The physical erasing unit 71 includes physical programming units 711(0) to 711(D). The memory management circuit 51 may determine the physical erasing unit 71 from the rewritable non-volatile memory module 43 according to the data 701 to be stored. For example, the memory management circuit 51 may select one of the physical erasing units 610(A+1) to 610(B) from the spare area 602 of FIG. 6 as the physical erasing unit 71.

In an exemplary embodiment, before storing the data 701 according to the write command, the memory management circuit 51 may check the status of at least part of the physical programming units (also referred to as a first physical programming unit) in the physical erasing unit 71. In response to the status of the first physical programming unit being a specific status (also referred to as a first status), the memory management circuit 51 may execute a data write operation (also referred to as a first write operation) on the first physical programming unit according to the data 701. The first write operation may be configured to store at least part of the data 701 to the first physical programming unit. For example, in the first write operation, the memory management circuit 51 may send a write command sequence (also referred to as a first command sequence) to the rewritable non-volatile memory module 43. The first command sequence may be configured to instruct the rewritable non-volatile memory module 43 to store at least part of the data to the data 701 into the first physical programming unit.

In other words, in response to the status of the first physical programming unit being the first status, the memory management circuit 51 may allow the data 701 to be stored to the preselected physical erasing unit 71 (or the first physical programming unit). In an exemplary embodiment, the status of the first physical programming unit being the first status may also refer to the status of the first physical programming unit meeting a preset condition.

In an exemplary embodiment, the memory management circuit 51 may determine the total number of first physical programming units in the physical erasing unit 71 that may be configured to store the data 701 according to the total data amount of the data 701 to be stored. In an exemplary embodiment, it is assumed that a physical programming unit has a capacity of 16 kilobytes (KB). If the total data amount of the data 701 is less than or equal to the capacity of one physical programming unit (that is, 16 KB), the total number of first physical programming units may be one. Alternatively, if the total data amount of the data 701 is greater than the capacity of one physical programming unit (that is, 16 KB), the total number of first physical programming units may be multiple. Thereafter, in response to the status of the first physical programming unit being the first status, the memory management circuit 51 may execute the first write operation on the first physical programming unit according to the data 701.

Figure 8A:
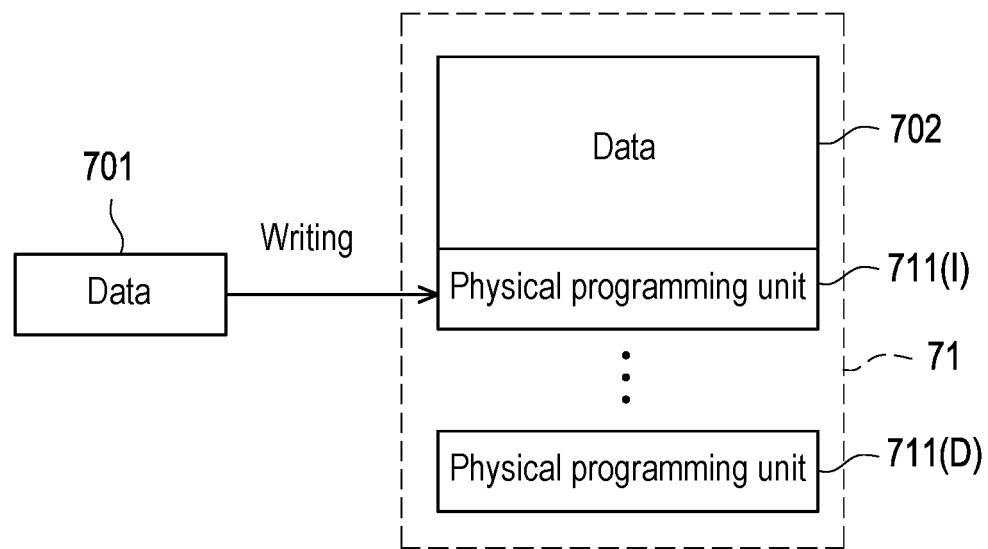
FIG. 8A is a schematic diagram of a first write operation according to an exemplary embodiment of the disclosure.

FIG. 8A is a schematic diagram of a first write operation according to an exemplary embodiment of the disclosure.

Please refer to FIG. 8A, it is assumed that data 702 is already stored in the physical erasing unit 71 before storing the data 701 to the physical erasing unit 71. The memory management circuit 51 may determine a physical programming unit 711(I) in the physical erasing unit 71 as the first physical programming unit according to the data 701 to be stored. In response to the status of the physical programming unit 711(I) being the first status, the memory management circuit 51 may execute the first write operation on the physical programming unit 711(I) according to the data 701 to store the data 701 to the physical programming unit 711(I).

Figure 8B:
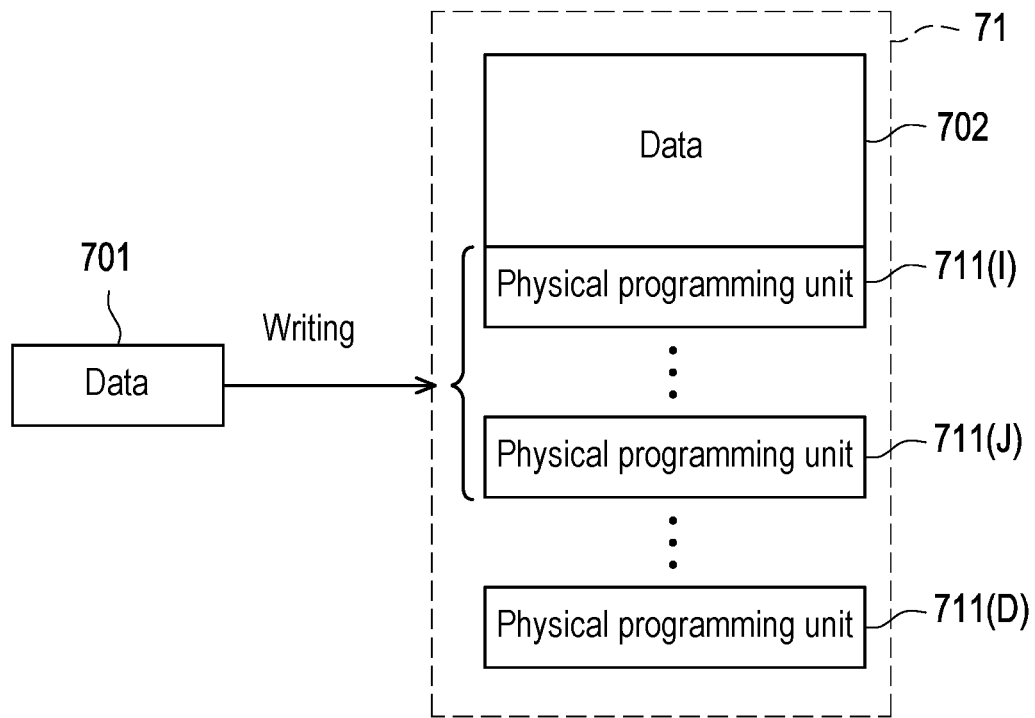
FIG. 8B is a schematic diagram of a first write operation according to an exemplary embodiment of the disclosure.

FIG. 8B is a schematic diagram of a first write operation according to an exemplary embodiment of the disclosure.

Please refer to FIG. 8B. It is assumed that the data 702 is also already stored in the physical erasing unit 71 before storing the data 701 to the physical erasing unit 71. The memory management circuit 51 may determine multiple physical programming units 711(I) to 711(J) in the physical erasing unit 71 all as the first physical programming units according to the data 701 to be stored. That is, the first physical programming unit may refer to any one of the physical programming units 711(I) to 711(J). In response to the statuses of the physical programming units 711(I) to 711(J) all being the first status, the memory management circuit 51 may execute the first write operation on the physical programming units 711(I) to 711(J) according to the data 701 to store the data 701 to the physical programming units 711(I) to 711(J). That is, the physical programming units 711(I) to 711(J) are respectively configured to store a part of the data 701.

Please return to FIG. 7. In an exemplary embodiment, the rewritable non-volatile memory module 43 further includes a physical erasing unit (also referred to as a second physical erasing unit) 72. The physical erasing unit 72 includes physical programming units 712(0) to 712(D). In response to the status of the first physical programming unit (that is, the physical erasing unit 71) not being the first status, the memory management circuit 51 may determine the physical erasing unit 72 from the rewritable non-volatile memory module 43 according to the data 701 to be stored. For example, the memory management circuit 51 may select another one of the physical erasing units 610 (A+1) to 610 (B) from the spare area 602 of FIG. 6 as the physical erasing unit 72. In response to the status of the first physical programming unit (that is, the physical erasing unit 71) not being the first status, the memory management circuit 51 may use the physical erasing unit 72 to replace the physical erasing unit 71 to store the data 701.

In an exemplary embodiment, after determining the physical erasing unit 72, the memory management circuit 51 may also check the status of at least part of the physical programming units (also referred to as a second physical programming unit) in the physical erasing unit 72. The total number of second physical programming units may also be determined according to the total data amount of the data 701. In response to the status of the second physical programming unit being the first status, the memory management circuit 51 may execute a data write operation (also referred to as a second write operation) on the second physical programming unit according to the data 701. The second write operation may be configured to store at least part of the data 701 to the second physical programming unit. For example, in the second write operation, the memory management circuit 51 may send a write command sequence (also referred to as a second command sequence) to the rewritable non-volatile memory module 43. The second command sequence may be configured to instruct the rewritable non-volatile memory module 43 to store at least part of the data 701 to the second physical programming unit.

In other words, in response to the status of the first physical programming unit not being the first status, the memory management circuit 51 may not allow the data 701 to be stored to the preselected physical erasing unit 71 (or the first physical programming unit). Instead, in response to the status of the second physical programming unit being the first status, the memory management circuit 51 may store the data 701 to the physical erasing unit 72 (or the second physical programming unit) through the second write operation. In an exemplary embodiment, the status of the second physical programming unit being the first status may also refer to the status of the second physical programming unit meeting the preset condition.

In an exemplary embodiment, if the status of the second physical programming unit is also not the first status, another physical erasing unit (also referred to as a third physical erasing unit) in the rewritable non-volatile memory module 43 may also be determined, and at least part of the physical programming units (also referred to as a third physical programming unit) in the third physical programming unit may be used to replace the second physical programming unit to store the data 701 on the premise that the preset condition is satisfied (that is, the status of the third physical programming unit is the first status).

In an exemplary embodiment, in response to the status of the first physical programming unit not being the first status, the memory management circuit 51 may further execute a data move operation on the first physical erasing unit. The data move operation may be configured to move at least part of the data in the first physical erasing unit to the second physical erasing unit. For example, in the data move operation, the memory management circuit 51 may send a specific command sequence (also referred to as a third command sequence) to the rewritable non-volatile memory module 43. The third command sequence may be configured to instruct the rewritable non-volatile memory module 43 to move at least part of the data in the first physical erasing unit to the second physical erasing unit. In particular, the data moved in the data move operation may include valid data already stored in the first physical erasing unit. In addition, the data move operation may be execute before or after the second write operation or synchronously with the second write operation, which is not limited in the disclosure.

Figure 9:
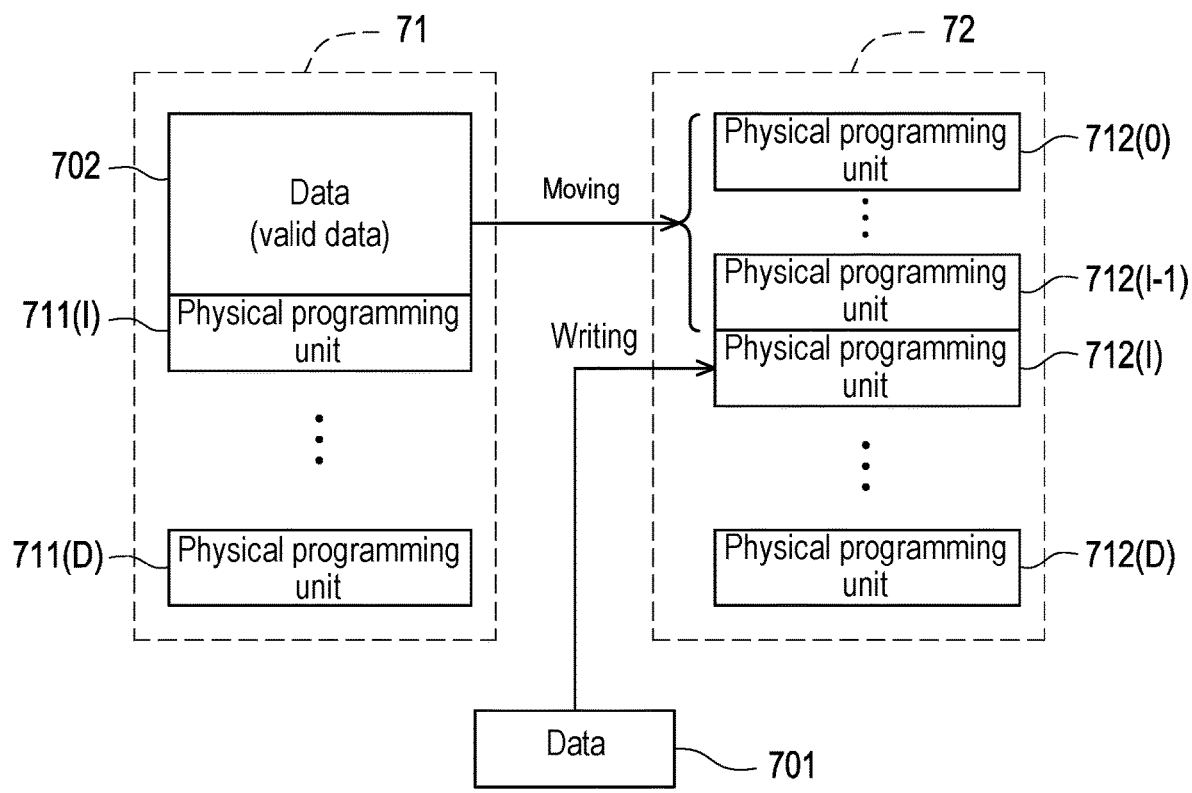
FIG. 9 is a schematic diagram of a second write operation and a data move operation according to an exemplary embodiment of the disclosure.

FIG. 9 is a schematic diagram of a second write operation and a data move operation according to an exemplary embodiment of the disclosure.

Please refer to FIG. 9. It is assumed that the data 702 is already stored in the physical erasing unit 71 before storing the data 701 to the physical erasing unit 71. In response to the status of the first physical programming unit (for example, the physical programming unit 711(I)) not being the first status, the memory management circuit 51 may select the physical erasing unit 72 to replace the physical erasing unit 71 to store the data 701. At the same time, the memory management circuit 51 may determine a physical programming unit 712(I) in the physical erasing unit 72 as the second physical programming unit according to the data 701 to be stored. In response to the status of the physical programming unit 712(I) being the first status, the memory management circuit 51 may execute the second write operation on the physical programming unit 712(I) according to the data 701 to store the data 701 to the physical programming unit 712(I). In addition, the data 701 may also be stored to more second physical programming units in the physical erasing unit 72, depending on the total data amount of the data 701.

On the other hand, the memory management circuit 51 may execute the data move operation on the physical erasing unit 71 to move the data 702 (that is, valid data) stored in the physical erasing unit 71 to the physical erasing unit 72 for storage. For example, the data 702 may be stored to physical programming units 712(0) to 712(I-1) in the physical erasing unit 72. In addition, the actual storage addresses of the data 701 and 702 in the physical erasing unit 72 may also be adjusted according to practical requirements, which is not limited in the disclosure. For example, in an exemplary embodiment, in the physical erasing unit 72, the physical programming unit for storing the data 701 may also be ordered before the physical programming unit for storing the data 702, which is not limited in the disclosure.

Figure 10:
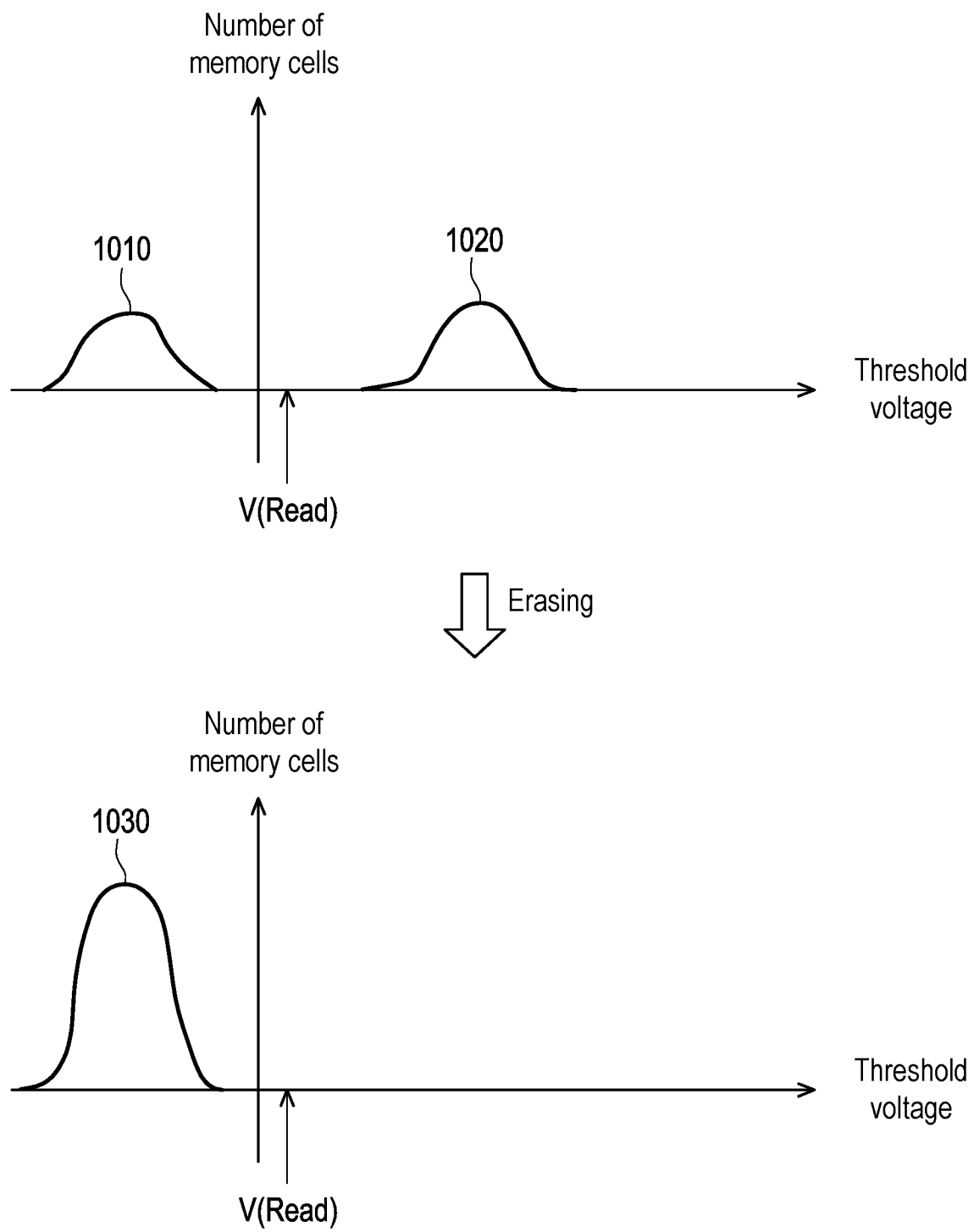
FIG. 10 is a schematic diagram of a threshold voltage distribution of memory cells in a first physical programming unit under different statuses according to an exemplary embodiment of the disclosure.

FIG. 10 is a schematic diagram of a threshold voltage distribution of memory cells in a first physical programming unit under different statuses according to an exemplary embodiment of the disclosure.

Please refer to FIG. 10. After programming the first physical programming unit, under a programming status, the threshold voltage distribution of the memory cells in the first physical programming unit may include statuses 1010 and 1020. The memory cells belonging to the status 1010 and the memory cells belonging to the status 1020 may be respectively configured to store different bit data. For example, the memory cells belonging to the status 1010 may be configured to store bit "1", and the memory cells belonging to the status 1020 may be configured to store bit "0". However, it should be noted that the threshold voltage distribution of the memory cells in FIG. 10 is only an example and is not intended to limit the disclosure. In another exemplary embodiment, different types of programming operations are executed on the memory cells, the memory cells in the first physical programming unit may have different statuses, and the bit data corresponding to each status may also be set according to practical requirements, which is not limited in the disclosure.

When data is to be read from the first physical programming unit, a read voltage level V(Read) may be applied to the first physical programming unit (for example, a word line where the first physical programming unit is located). The rewritable non-volatile memory module 43 may return a read result corresponding to the first physical programming unit to the memory management circuit 51. For example, the read result may reflect that a threshold voltage of a certain memory cell belonging to the status 1010 is less than the read voltage level V(Read) and/or a threshold voltage of a certain memory cell belonging to the status 1020 is greater than the read voltage level V(Read). In this way, the memory management circuit 51 may obtain the status of each memory cell in the first physical programming unit, thereby obtaining the data stored in each of the memory cells according to the statuses of the memory cells.

In an exemplary embodiment, after an erase operation is executed on the first physical programming unit (or the first physical erasing unit including the first physical programming unit), each memory cell in the first physical programming unit is theoretically in a status 1030. The status 1030 is also referred to as an erasure status. Under the erasure status, the data previously stored in the first physical programming unit is already erased (that is, cleared).

It should be noted that in the aforementioned exemplary embodiment, under the ideal status, the memory cells in the physical programming unit (for example, the first physical programming unit) selected by the memory management circuit 51 to store the new data (for example, the data 701) should all be in the erasure status to avoid repeatedly writing data to the same memory cell in subsequent data write operations. Repeatedly writing data may cause degraded writing quality (for example, increased bit error rate) of newly written data.

However, the physical programming unit (for example, the first physical programming unit) that is already erased in practice may still be in the programming status instead of the default erasure status due to factors such as "word line short". For example, due to the influence of word line short, even if the first physical programming unit is already erased and the memory cells in the first physical programming unit are all in the erasure status, when another physical programming unit in the rewritable non-volatile memory module 43 is programmed to write new data, at least part of the memory cells in the first physical programming unit may also be synchronously programmed, causing at least part of the memory cells in the first physical programming unit to unexpectedly switch from the default erasure status to the programming status. Thereafter, if the memory management circuit 51 does not notice that the status of at least part of the memory cells in the first physical programming unit is already in the programming status and performs the data write operation on the first physical programming unit to store the new data, the writing quality of the data may be degraded (for example, increased bit error rate) due to repeated writing to the memory cells.

In an exemplary embodiment, during the process of checking the status of the first physical programming unit, the memory management circuit 51 may check whether there is a memory cell not in the erasure status in the first physical programming unit. In response to the presence of the memory cell not in the erasure status in the first physical programming unit, the memory management circuit 51 may judge that the status of the first physical programming unit is not the first status. On the contrary, in response to the checked memory cells in the first physical programming unit being all in the erasure status, the memory management circuit 51 may judge that the status of the first physical programming unit is the first status.

In an exemplary embodiment, during the process of checking the status of the first physical programming unit, the memory management circuit 51 may judge whether the total number of checked memory cells not in the erasure status (that is, the memory cells in the programming status) in the first physical programming unit exceeds a threshold value. In response to the total number of checked memory cells in the first physical programming unit not in the erasure status exceeding the threshold value, the memory management circuit 51 may judge that the status of the first physical programming unit is not the first status. On the contrary, in response to the total number of checked memory cells in the first physical programming unit not in the erasure status not exceeding the threshold value, the memory management circuit 51 may still judge that the status of the first physical programming unit is the first status.

In an exemplary embodiment, the memory management circuit 51 may determine the threshold value according to the total number of memory cells in the first physical programming unit. For example, the threshold value may be obtained by multiplying the total number of memory cells in the first physical programming unit by a scale value. For example, the ratio value may be 2%, 5%, 10%, etc., and the ratio value may be adjusted according to practical requirements.

In an exemplary embodiment, during the process of checking the status of the first physical programming unit, the memory management circuit 51 may send a specific command sequence (also referred to as a fourth command sequence) to the rewritable non-volatile memory module 43. The fourth command sequence may be configured to instruct the rewritable non-volatile memory module 43 to execute a read operation on the first physical programming unit to obtain status data corresponding to the first physical programming unit. The status data may reflect the status of at least part of the memory cells in the first physical programming unit. The memory management circuit 51 may determine the status of the first physical programming unit according to the status data. For example, the memory management circuit 51 may determine whether the status of the first physical programming unit is the first status according to the status data.

In an exemplary embodiment, the memory management circuit 51 may judge whether the status data includes specific data. The specific data may reflect that at least one memory cell in the first physical programming unit is not in the erasure status. If the status data includes the specific data, the memory management circuit 51 may judge that the status of the first physical programming unit is not the first status according to the specific data (for example, the total number of the specific data). If the status data does not include the specific data, the memory management circuit 51 may judge that the status of the first physical programming unit is the first status.

Figure 11:
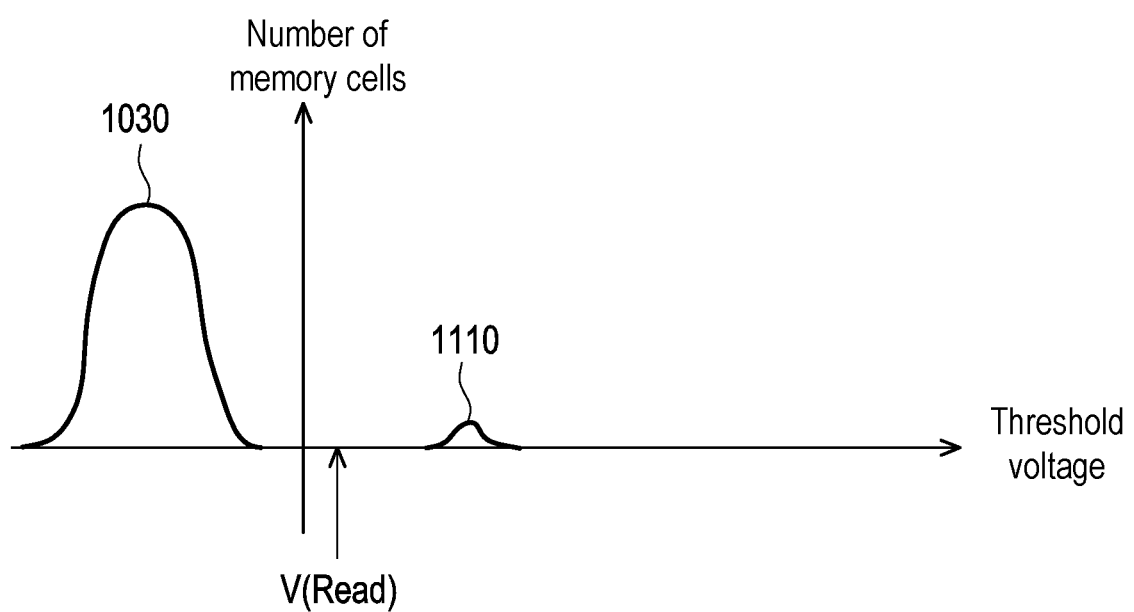
FIG. 11 is a schematic diagram of a threshold voltage distribution of memory cells in a first physical programming unit according to an exemplary embodiment of the disclosure.

FIG. 11 is a schematic diagram of a threshold voltage distribution of memory cells in a first physical programming unit according to an exemplary embodiment of the disclosure.

Please refer to FIG. 11. In an exemplary embodiment, it is assumed that the threshold voltage distribution of the memory cells in the erased first physical programming unit includes the statuses 1030 and 1110. Most of the memory cells are in the erasure status (that is, the status 1030) due to being already erased, and only a small part of the memory cells is in the programming status (that is, the status 1110) again due to factors such as word line short. However, the threshold voltage distribution of the memory cells in the first physical programming unit may vary according to practical conditions, which is not limited in the disclosure.

In an exemplary embodiment, during the process of checking the status of the first physical programming unit, the memory management circuit 51 may instruct the rewritable non-volatile memory module 43 to use the read voltage level V(Read) to read the first physical programming unit. According to the read result returned by the rewritable non-volatile memory module 43, the memory management circuit 51 may obtain the status data corresponding to the first physical programming unit. For example, the status data may include a large number of bits "1" and a few bits "0", wherein the total number of bits "1" may reflect the total number of memory cells belonging to the status 1030, and the total number of bits "0" may reflect the total number of memory cells belonging to the status 1110.

In an example embodiment, the specific data may include bit "1" in the status data. The memory management circuit 51 may determine the status of the first physical programming unit according to the total number of bits "1", the total number of bits "0", and/or the ratio of bits "1" to bits "0" in the status data. For example, the memory management circuit 51 may determine the status of the first physical programming unit according to whether the total number of bits "1" is greater than a threshold value, whether the total number of bits "0" is greater than a threshold value, or whether the ratio of bits "1" to bits "0" is greater than a ratio value. For example, in an exemplary embodiment, in response to the total number of bits "1" in the status data being greater than the threshold value, the total number of bits "0" being less than the threshold value, or the ratio of bits "1" to bits "0" being greater than the ratio value, the memory management circuit 51 may judge that the status of the first physical programming unit is the first status. On the contrary, in response to the total number of bits "1" in the status data being not greater than the threshold value, the total number of bits "0" being not less than the threshold value, or the ratio of bits "1" to bits "0" being not greater than the ratio value, the memory management circuit 51 may judge that the status of the first physical programming unit is not the first status.

In an exemplary embodiment, the status data may reflect the status of all the memory cells in the first physical programming unit. In an exemplary embodiment, the status data only reflects the status of a part of the memory cells in the first physical programming unit. For example, assuming that the first physical programming unit includes P memory cells, the status data may reflect statuses of Q memory cells in the first physical programming unit, where Q is less than P. Alternatively, assuming that the data amount stored in the first physical programming unit is 16 KB, the status data may be only 4 KB or other values less than 16 KB.

In this way, the data amount to be read and/or analyzed can be effectively reduced.

From another perspective, in an exemplary embodiment, the memory management circuit 51 may determine the status of the first physical programming unit according to the status of a part of the memory cells in the first physical programming unit, without completely reading the entire first physical programming unit (or all the memory cells in the first physical programming unit). In this way, the efficiency of determining the status of the first physical programming unit can be improved.

In an exemplary embodiment, if the status of the first physical programming unit is the first status, it means that the total number of memory cells in the first physical programming unit that should be in the erasure status but are actually in the programming status does not exceed an allowable value (or there is no memory cell in the programming status). Therefore, the memory management circuit 51 may continue to use the first physical programming unit to store data. However, if the status of the first physical programming unit is not the first status, it means that the total number of memory cells in the first physical programming unit that should be in the erasure status but are actually in the programming status already exceeds the allowable value. Therefore, the memory management circuit 51 may change to using other physical erasing units (for example, the second physical erasing unit) to store data, so as to improve the storage quality of data. At the same time, the valid data in the first physical erasing unit may be simultaneously moved to the new physical erasing unit (for example, the second physical erasing unit) for storage, and the first physical erasing unit may be erased again and recycled to the spare area 602 of FIG. 6. The next time the first physical erasing unit is selected to store data, the same operation may be used to verify the first physical erasing unit to ensure the writing quality of data for the first physical erasing unit (or the first physical programming unit). The related operation details have been described in detail above and will not be repeated here.

Figure 12:
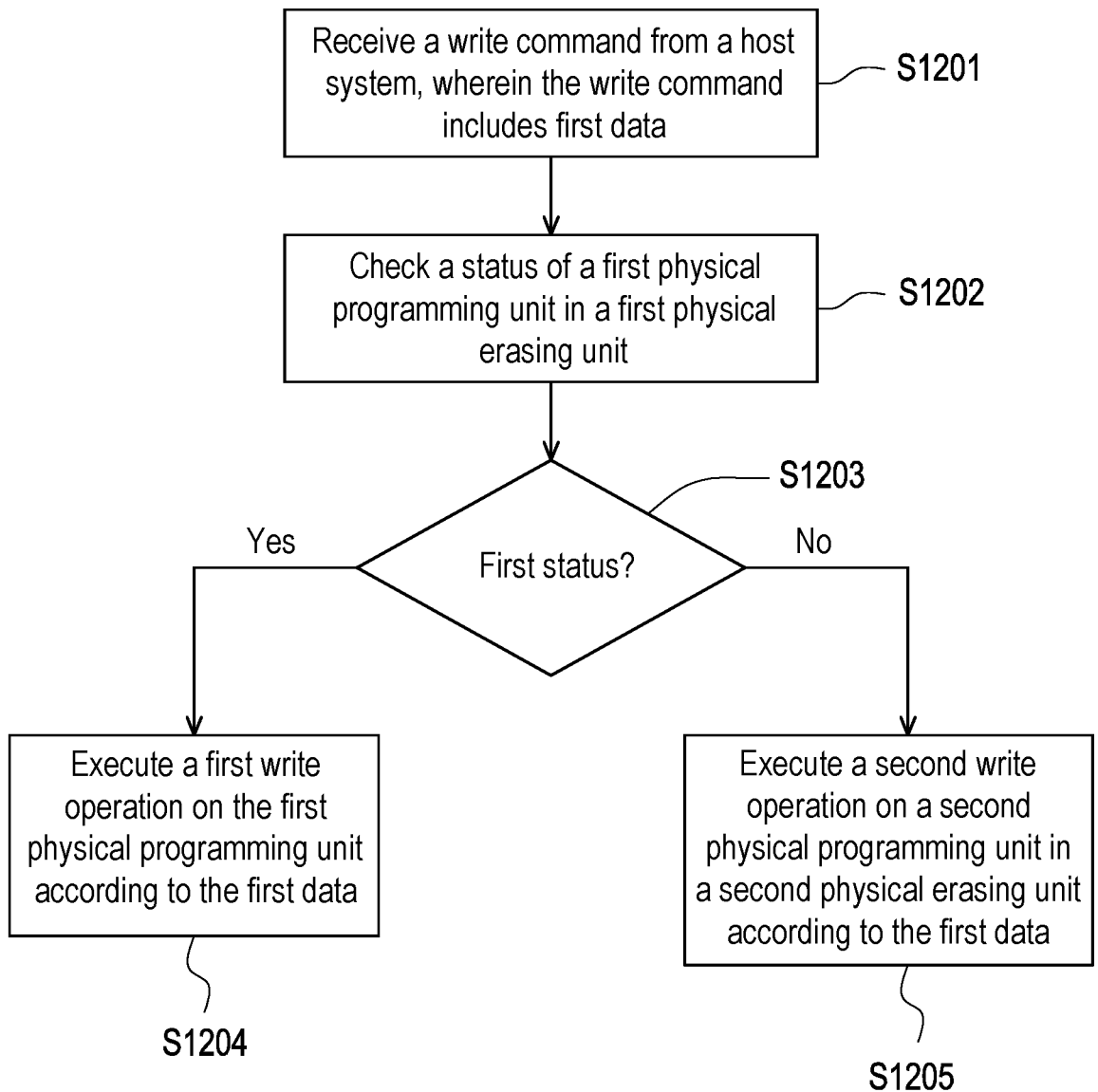
FIG. 12 is a flowchart of a data writing method according to an exemplary embodiment of the disclosure.

FIG. 12 is a flowchart of a data writing method according to an exemplary embodiment of the disclosure.

Please refer to FIG. 12. In Step S1201, a write command is received from a host system, wherein the write command includes first data. In Step S1202, a status of a first physical programming unit in a first physical erasing unit is checked. In Step S1203, whether the status of the first physical programming unit is a first status is judged. In response to the status of the first physical programming unit being the first status, in Step S1204, a first write operation is executed on the first physical programming unit according to the first data. For example, the first write operation is configured to store at least part of the first data to the first physical programming unit. Alternatively, in response to the status of the first physical programming unit not being the first status, in Step S1205, a second write operation is executed on a second physical programming unit in a second physical erasing unit according to the first data. For example, the second write operation is configured to store at least part of the first data to the second physical programming unit.

Figure 13:
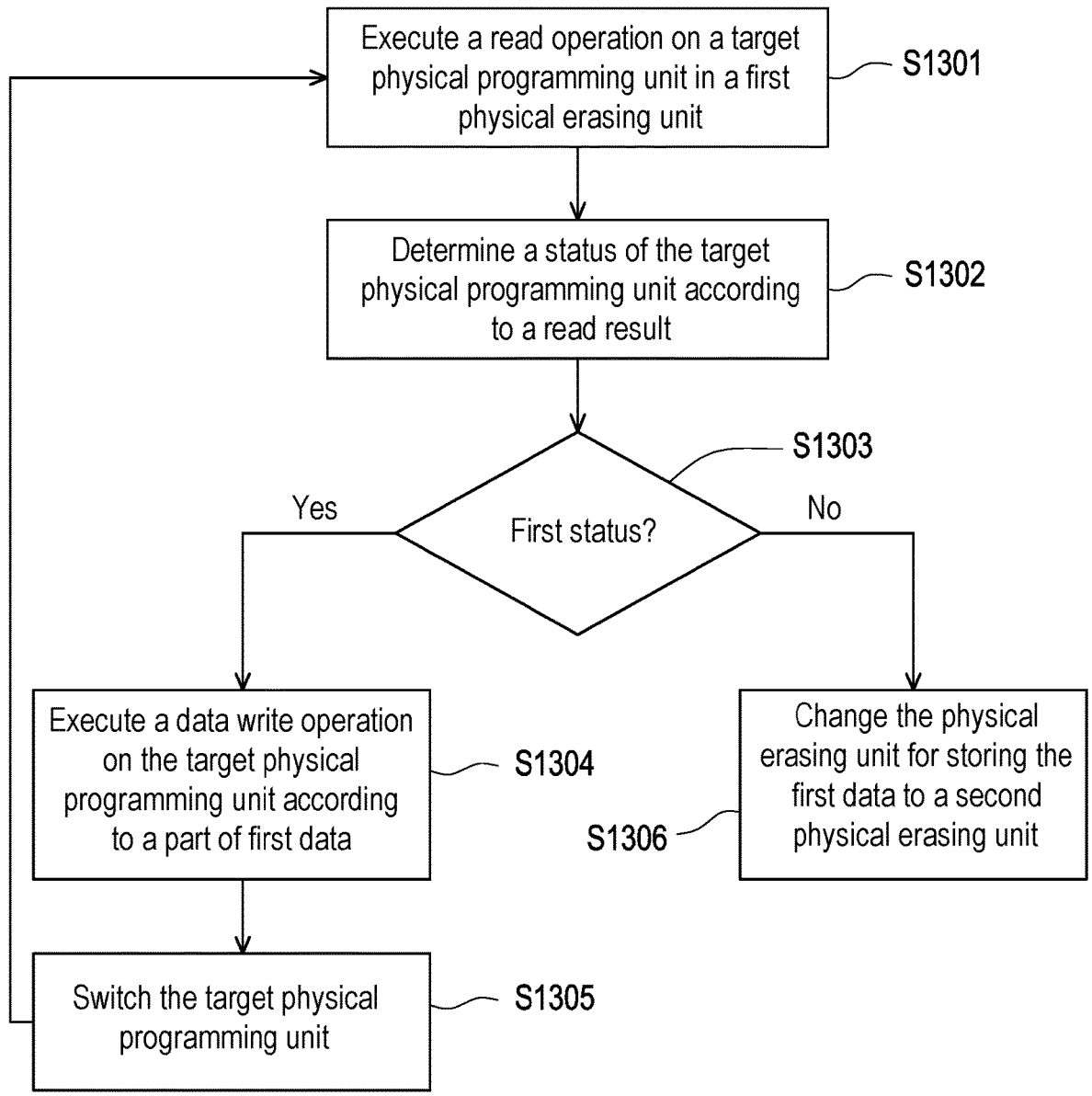
FIG. 13 is a flowchart of a data writing method according to an exemplary embodiment of the disclosure.

FIG. 13 is a flowchart of a data writing method according to an exemplary embodiment of the disclosure.

Please refer to FIG. 13. In Step S1301, a read operation is executed on a specific physical programming unit (also referred to as a target physical programming unit) in a first physical erasing unit. For example, the target physical programming unit is one of multiple first physical programming units. In Step S1302, a status of the target physical programming unit is determined according to a read result. In Step S1303, whether the status of the target physical programming unit is a first status is judged. In response to the status of the target physical programming unit being the first status, in Step S1304, a data write operation is executed on the target physical programming unit according to a part of first data. In Step S1305, the target physical programming unit is switched. For example, the target physical programming unit is switched to another one of the first physical programming units. Then, Step S1301 may be repeatedly executed. On the other hand, in response to the status of the target physical programming unit not being the first status, in Step S1306, the physical erasing unit for storing the first data is changed from the first physical erasing unit to a second physical erasing unit.

Figure 14:
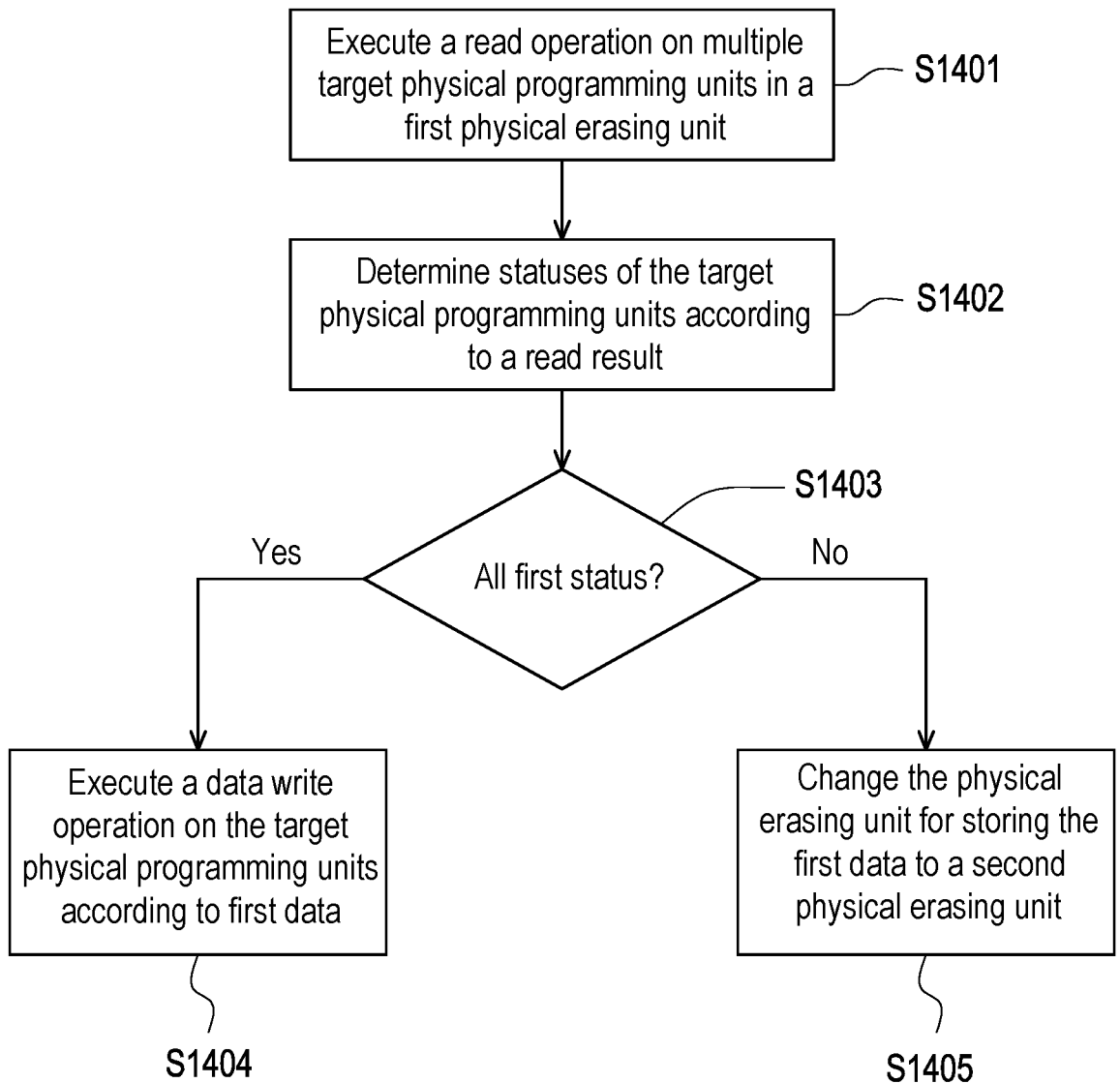
FIG. 14 is a flowchart of a data writing method according to an exemplary embodiment of the disclosure.

FIG. 14 is a flowchart of a data writing method according to an exemplary embodiment of the disclosure.

Please refer to FIG. 14. In Step S1401, a read operation is executed on multiple target physical programming units in a first physical erasing unit. For example, each target physical programming unit is one of multiple first physical programming units. In Step S1402, statuses of the target physical programming units are determined according to a read result. In Step S1403, whether the statuses of the target physical programming units are all a first status is judged. In response to that the statuses of the target physical programming units being all the first status, in Step S1404, a data write operation is executed on the target physical programming units according to first data. Alternatively, in response to that the statuses of the target physical programming units being not all the first status (that is, at least one target physical programming unit is not in the first status), in Step S1405, the physical erasing unit for storing the first data is changed from the first physical erasing unit to a second physical erasing unit.

However, each step in FIG. 12 to FIG. 14 has been described in detail as above and will not be repeated here. It is worth noting that each step in FIG. 12 to FIG. 14 may be implemented as multiple program codes or circuits, which is not limited in the disclosure. In addition, the methods of FIG. 12 to FIG. 14 may be used in conjunction with the above exemplary embodiments and may also be used alone, which is not limited in the disclosure.

In summary, in the data writing method, the memory storage device, and the memory control circuit unit provided by the embodiments of the disclosure, the status of the first physical programming unit may be checked before writing data to the first physical programming unit. If the status of the first physical programming unit is as expected (that is, the status of the first physical programming unit is the first status), executing the first write operation on the first physical programming unit is allowed to store the first data to the first physical programming unit. However, if the status of the first physical programming unit is not as expected (that is, the status of the first physical programming unit is not the first status), the second physical erasing unit may be used to replace the first physical erasing unit to store the first data. In this way, repeated writing to a specific physical programming unit can be effectively avoided and the writing quality of data can be improved.

Although the disclosure is already disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A data writing method for a rewritable non-volatile memory module, wherein the rewritable non-volatile memory module comprises a plurality of physical erasing units, the physical erasing units comprise a first physical erasing unit, and the data writing method comprises:
receiving a write command from a host system, wherein the write command comprises first data;
before storing the first data, checking a status of a first physical programming unit in the first physical erasing unit, wherein the first physical programming unit is determined according to the first data; and
in response to the status of the first physical programming unit being a first status, sending a first command sequence, wherein the first command sequence is configured to instruct the rewritable non-volatile memory module to store at least part of the first data to the first physical programming unit,
wherein the step of checking the status of the first physical programming unit in the first physical erasing unit comprises:
checking whether a total number of memory cell not in an erasure status in the first physical programming unit exceeds a threshold value; and
in response to the total number of memory cell not in the erasure status in the first physical programming unit exceeding the threshold value, judging that the status of the first physical programming unit is not the first status.

2. The data writing method according to claim 1, further comprising:
according to a data amount of the first data and a capacity of a physical programming unit, determining a total number of the first physical programming unit.

3. The data writing method according to claim 1, wherein the physical erasing units further comprise a second physical erasing unit, and the data writing method further comprises:
in response to the status of the first physical programming unit not being the first status, sending a second command sequence, wherein the second command sequence is configured to instruct the rewritable non-volatile memory module to store the at least part of the first data to the second physical programming unit.

4. The data writing method according to claim 3, further comprising:
in response to the status of the first physical programming unit not being the first status, sending a third command sequence, wherein the third command sequence is configured to instruct the rewritable non-volatile memory module to move at least part of data in the first physical erasing unit to the second physical erasing unit.

5. The data writing method according to claim 1, wherein the step of checking the status of the first physical programming unit in the first physical erasing unit comprises:
sending a fourth command sequence, wherein the fourth command sequence is configured to instruct the rewritable non-volatile memory module to execute a read operation on the first physical programming unit to obtain status data corresponding to the first physical programming unit, wherein the status data reflects a status of at least part of memory cells in the first physical programming unit; and
determining the status of the first physical programming unit according to the status data.

6. The data writing method according to claim 5, wherein the step of determining the status of the first physical programming unit according to the status data comprises:
according to specific data in the status data, judging that the status of the first physical programming unit is not the first status,
wherein the specific data reflects that at least one memory cell in the first physical programming unit is not in an erasure status.

7. The data writing method according to claim 5, wherein the first physical programming unit comprises P memory cells, and the status data reflects statuses of Q memory cells in the first physical programming unit, where Q is less than P.

8. A memory storage device, comprising:
a host interface unit, configured to couple to a host system;
a rewritable non-volatile memory module, wherein the rewritable non-volatile memory module comprises a plurality of physical erasing units, and the physical erasing units comprise a first physical erasing unit; and
a memory control circuit unit, coupled to the host interface unit and the rewritable non-volatile memory module,
wherein the memory control circuit unit is configured to:
receive a write command from the host system, wherein the write command comprises first data;
before storing the first data, check a status of a first physical programming unit in the first physical erasing unit, wherein the first physical programming unit is determined according to the first data; and
in response to the status of the first physical programming unit being a first status, send a first command sequence, wherein the first command sequence is configured to instruct the rewritable non-volatile memory module to store at least part of the first data to the first physical programming unit,
wherein the operation of the memory control circuit unit checking the status of the first physical programming unit in the first physical erasing unit comprises:
checking whether a total number of memory cell not in an erasure status in the first physical programming unit exceeds a threshold value; and
in response to the total number of memory cell not in the erasure status in the first physical programming unit exceeding the threshold value, judging that the status of the first physical programming unit is not the first status.

9. The memory storage device according to claim 8, wherein the memory control circuit unit is further configured to:
according to a total data amount of the first data and a capacity of a physical programming unit, determine a total number of the first physical programming unit.

10. The memory storage device according to claim 8, wherein the physical erasing units further comprise a second physical erasing unit, and the memory control circuit unit is further configured to:
in response to the status of the first physical programming unit not being the first status, send a second command sequence, wherein the second command sequence is configured to instruct the rewritable non-volatile memory module to store the at least part of the first data to the second physical programming unit.

11. The memory storage device according to claim 10, wherein the memory control circuit unit is further configured to:
in response to the status of the first physical programming unit not being the first status, send a third command sequence, wherein the third command sequence is configured to instruct the rewritable non-volatile memory module to move at least part of data in the first physical erasing unit to the second physical erasing unit.

12. The memory storage device according to claim 8, wherein the operation of the memory control circuit unit checking the status of the first physical programming unit in the first physical erasing unit comprises:

sending a fourth command sequence, wherein the fourth command sequence is configured to instruct the rewritable non-volatile memory module to execute a read operation on the first physical programming unit to obtain status data corresponding to the first physical programming unit, wherein the status data reflects a status of at least part of memory cells in the first physical programming unit; and
determining the status of the first physical programming unit according to the status data.

13. The memory storage device according to claim 12, wherein the operation of the memory control circuit unit determining the status of the first physical programming unit according to the status data comprises:
according to specific data in the status data, judging that the status of the first physical programming unit is not the first status,
wherein the specific data reflects that at least one memory cell in the first physical programming unit is not in an erasure status.

14. The memory storage device according to claim 12, wherein the first physical programming unit comprises P memory cells, and the status data reflects statuses of Q memory cells in the first physical programming unit, where Q is less than P.

15. A memory control circuit unit, configured to control a rewritable non-volatile memory module, wherein the rewritable non-volatile memory module comprises a plurality of physical erasing units, the physical erasing units comprise a first physical erasing unit, and the memory control circuit unit comprises:
a host interface, configured to couple to a host system;
a memory interface, configured to couple to the rewritable non-volatile memory module; and
a memory management circuit, coupled to the host interface and the memory interface, wherein the memory management circuit is configured to:
receive a write command from the host system, wherein the write command comprises first data;
before storing the first data, check a status of a first physical programming unit in the first physical erasing unit, wherein the first physical programming unit is determined according to the first data; and
in response to the status of the first physical programming unit being a first status, send a first command sequence, wherein the first command sequence is configured to instruct the rewritable non-volatile memory module to store at least part of the first data to the first physical programming unit,
wherein the operation of the memory management circuit checking the status of the first physical programming unit in the first physical erasing unit comprises:
checking whether a total number of memory cell not in an erasure status in the first physical programming unit exceeds a threshold value; and
in response to the total number of memory cell not in the erasure status in the first physical programming unit exceeding the threshold value, judging that the status of the first physical programming unit is not the first status.

16. The memory control circuit unit according to claim 15, wherein the memory management circuit is further configured to:
according to a total data amount of the first data and a capacity of a physical programming unit, determine a total number of the first physical programming unit.

17. The memory control circuit unit according to claim 15, wherein the physical erasing units further comprise a second physical erasing unit, and the memory management circuit is further configured to:
  in response to the status of the first physical programming unit not being the first status, send a second command sequence, wherein the second command sequence is configured to instruct the rewritable non-volatile memory module to store the at least part of the first data to the second physical programming unit.

18. The memory control circuit unit according to claim 17, wherein the memory management circuit is further configured to:
  in response to the status of the first physical programming unit not being the first status, send a third command sequence, wherein the third command sequence is configured to instruct the rewritable non-volatile memory module to move at least part of data in the first physical erasing unit to the second physical erasing unit.

19. The memory control circuit unit according to claim 15, wherein the operation of the memory management circuit checking the status of the first physical programming unit in the first physical erasing unit comprises:
  sending a fourth command sequence, wherein the fourth command sequence is configured to instruct the rewritable non-volatile memory module to execute a read operation on the first physical programming unit to obtain status data corresponding to the first physical programming unit, wherein the status data reflects a status of at least part of memory cells in the first physical programming unit; and
  determining the status of the first physical programming unit according to the status data.

20. The memory control circuit unit according to claim 19, wherein the operation of the memory management circuit determining the status of the first physical programming unit according to the status data comprises:
  according to specific data in the status data, judging that the status of the first physical programming unit is not the first status,
  wherein the specific data reflects that at least one memory cell in the first physical programming unit is not in an erasure status.

21. The memory control circuit unit according to claim 19, wherein the first physical programming unit comprises P memory cells, and the status data reflects statuses of Q memory cells in the first physical programming unit, where Q is less than P.

* * * * *